US005630403A

United States Patent [19]

Van Kampen et al.

[11] Patent Number: 5,630,403

[45] Date of Patent: May 20, 1997

[54] FORCE-BALANCED SONIC FLOW EMISSION CONTROL VALVE

[75] Inventors: Leo Van Kampen, Dover Centre; John E. Cook, Chatham, both of Canada

[73] Assignee: Siemens Electric Limited, Mississauga, Canada

[21] Appl. No.: 662,554

[22] Filed: Jun. 13, 1996

[51] Int. Cl.[6] .......... F02M 33/02; F16K 31/06

[52] U.S. Cl. .......... 123/520; 251/129.17; 251/118

[58] Field of Search .......... 251/15, 118, 129.07, 251/129.17, 129.15, 332; 137/587; 123/516, 518, 519, 520

[56] References Cited

U.S. PATENT DOCUMENTS

| | | | |
|---|---|---|---|
| 4,085,721 | 4/1978 | Vardi et al. | 123/136 |
| 4,326,489 | 4/1982 | Heitert | 123/520 |
| 4,773,445 | 9/1988 | Visket | 251/129.15 |
| 4,894,072 | 1/1990 | Turner et al. | 55/179 |
| 4,901,702 | 2/1990 | Beicht et al. | 123/520 |
| 4,932,444 | 6/1990 | Micek | 141/59 |
| 4,953,514 | 9/1990 | Beicht et al. | 123/520 |
| 5,054,454 | 10/1991 | Hamburg | 123/520 |
| 5,080,078 | 1/1992 | Hamburg | 123/521 |
| 5,083,546 | 1/1992 | Detweiler et al. | 123/516 |
| 5,117,797 | 6/1992 | Telep et al. | 123/520 |
| 5,220,897 | 6/1993 | Buchalla et al. | 123/520 |
| 5,235,955 | 8/1993 | Osaki | 123/520 |
| 5,249,561 | 10/1993 | Thompson | 123/520 |
| 5,277,167 | 1/1994 | DeLand et al. | 123/518 |
| 5,282,604 | 2/1994 | Wade | 251/129.17 |
| 5,284,121 | 2/1994 | Abe et al. | 123/520 |
| 5,363,832 | 11/1994 | Suzumura et al. | 123/704 |
| 5,373,822 | 12/1994 | Thompson | 123/520 |
| 5,413,082 | 5/1995 | Cook et al. | 123/520 |
| 5,429,099 | 7/1995 | DeLand | 123/520 |
| 5,513,832 | 5/1996 | Becker et al. | 251/129.15 |
| 5,551,406 | 9/1996 | Everinghaqm et al. | 123/520 |

*Primary Examiner*—Thomas N. Moulis

[57] ABSTRACT

The solenoid-operated valve's outlet port (26) is a tube having a thread (60) threaded into a threaded socket (66, 68) in a valve housing member (34). The valve seat (62) is at an end of the tube, and the extent to which the tube is threaded into the socket sets the position of the seat within the housing's interior (42). Once the position has been set, an adhesive sealant is applied and upon setting, forms a plug (164) which locks the tube in place and seals between the tube and the socket. The valve element (33) is spring-biased (160) closed on the seat, but when the solenoid is energized, it is unseated by the solenoid's armature (122) to which it is attached. The solenoid's stator (86, 88, 90) includes an annular shunt (90) which forms an air gap to the armature for the magnetic circuit that acts on the armature to unseat the valve element and which also holds the outer margin (154) of a diaphragm (124) sealed against the solenoid. The inner margin of the diaphragm is sealed to the armature. The diaphragm creates a space that is separated from the interior of the housing and to which vacuum at the outlet port is communicated via a passage (142) formed in the armature to provide force-balancing of the valve element. The outlet port also contains a sonic nozzle (28). The shunt is secured against the solenoid by tabs (102) at ends of the stator part (98) bent into interference with margins of notches (108) in the outer margin (104) of the shunt.

20 Claims, 4 Drawing Sheets

FORCE-BALANCED SONIC FLOW EMISSION CONTROL VALVE

FIELD OF THE INVENTION

This invention relates generally to on-board emission control systems for internal combustion engine powered motor vehicles, evaporative emission control systems for example, and more particularly to a new and unique emission control valve, such as a canister purge solenoid (CPS) valve for an evaporative emission control system.

BACKGROUND AND SUMMARY OF THE INVENTION

A typical on-board evaporative emission control system comprises a vapor collection canister that collects fuel vapor emitted from a tank containing volatile liquid fuel for the engine and a CPS valve for periodically purging collected vapor to an intake manifold of the engine. In a known evaporative system control system, the CPS valve comprises a solenoid that is under the control of a purge control signal generated by a microprocessor-based engine management system. A typical purge control signal is a duty-cycle modulated pulse waveform having a relatively low operating frequency, for example in the 5 Hz to 50 Hz range. The modulation may range from 0% to 100%. This means that for each cycle of the operating frequency, the solenoid is energized for a certain percentage of the time period of the cycle. As this percentage increases, the time for which the solenoid is energized also increases, and therefore so does the purge flow through the valve. Conversely, the purge flow decreases as the percentage decreases.

The response of certain known solenoid-operated purge valves is sufficiently fast that the armature/valve element may follow, at least to some degree, the duty-cycle modulated waveform that is being applied to the solenoid. The pulsating armature/valve element may impact internal stationary valve parts and in doing so may generate audible noise that may be deemed disturbing.

Changes in intake manifold vacuum that occur during normal operation of a vehicle may also act directly on a CPS valve in a way that upsets the intended control strategy unless provisions, such as a vacuum regulator valve for example, are included to take their influence into account. When the CPS valve is closed, manifold vacuum at the valve outlet is applied to the portion of the valve element that is closing the opening bounded by the valve seat. Changing manifold vacuum affects the start-to-flow duty cycle, potentially causing unpredictable flow if the valve element does not have sufficient time to achieve full open condition.

One general objective of the present invention is to provide an improved CPS valve that achieves more predictable purge flow control in spite of influences that tend to impair control accuracy. In furtherance of this general objective, a more specific objective is to endow a CPS valve with a characteristic that is effective over a wide range of intake manifold vacuum levels to consistently cause the actual purge flow to more predictably equate to that intended by the purge control signal irrespective of changing intake manifold vacuum. In accomplishing this objective in the inventive CPS valve, valve operation that is quieter than in certain other CPS valves can be achieved.

From commonly assigned U.S. Pat. No. 5,413,082, inter alia, it is known to incorporate a sonic nozzle function in a CPS valve to reduce the extent to which changing manifold vacuum influences flow through the valve during canister purging. The disclosed embodiment of CPS valve which is the subject of the present invention incorporates a sonic nozzle structure at its outlet. From U.S. Pat. No. 5,373,822, it is known to provide pressure-or force-balancing of the armature/valve element.

One generic aspect of the present invention resides in novel means for the integration of force-balancing and intake manifold vacuum de-sensitizing so that the start-to-flow duty cycle is significantly de-sensitized to changing intake manifold vacuum. The inventive CPS valve therefore exhibits quite consistent opening as its valve element unseats from the valve seat; it also exhibits quite consistent closing as the valve element re-seats on the valve seat. Because the inventive CPS valve achieves these consistencies, which are relatively quite well- defined and predictable, the duration within each duty cycle for which the sonic nozzle structure at the valve outlet functions as a true sonic nozzle is also quite well- defined and predictable, being equal to the duration of the duty cycle less the durations of valve element travel at initial valve unseating and at final valve re-seating where the proximity of the valve element to the valve seat prevents the sonic nozzle structure from operating as a true sonic nozzle, uninfluenced by the extent of flow restriction present between the unseated valve element and the valve seat. The sonic nozzle structure will therefore function as a true sonic nozzle over an entire duty cycle except for these initial unseating and final re-seating transitions. By making the valve element travel during which these transitions occur relatively short, the sonic nozzle structure can function as a true sonic nozzle over a larger portion of a duty cycle. Therefore, the inventive CPS valve can enable the actual mass purge flow that will occur during a duty cycle to be accurately correlated to the purge control duty cycle signal, and hence well-defined and well-predictable.

The inventive valve also possesses other novel features which are of benefit in fabricating the valve. One of these features relates to an especially convenient means for setting the valve seat in proper positional relation to the valve element at time of valve fabrication. Another relates to solenoid stator structure that facilitates incorporation of the force-balancing function. Still other features involve certain constructional details that provide additional distinctive benefits.

The foregoing, and other features, along with various advantages and benefits of the invention, will be seen in the ensuing description and claims which are accompanied by drawings. The drawings disclose a preferred embodiment of the invention according to the best mode contemplated at this time for carrying out the invention.

DESCRIPTION OF THE PREFERRED EMBODIMENT

Figure 1:
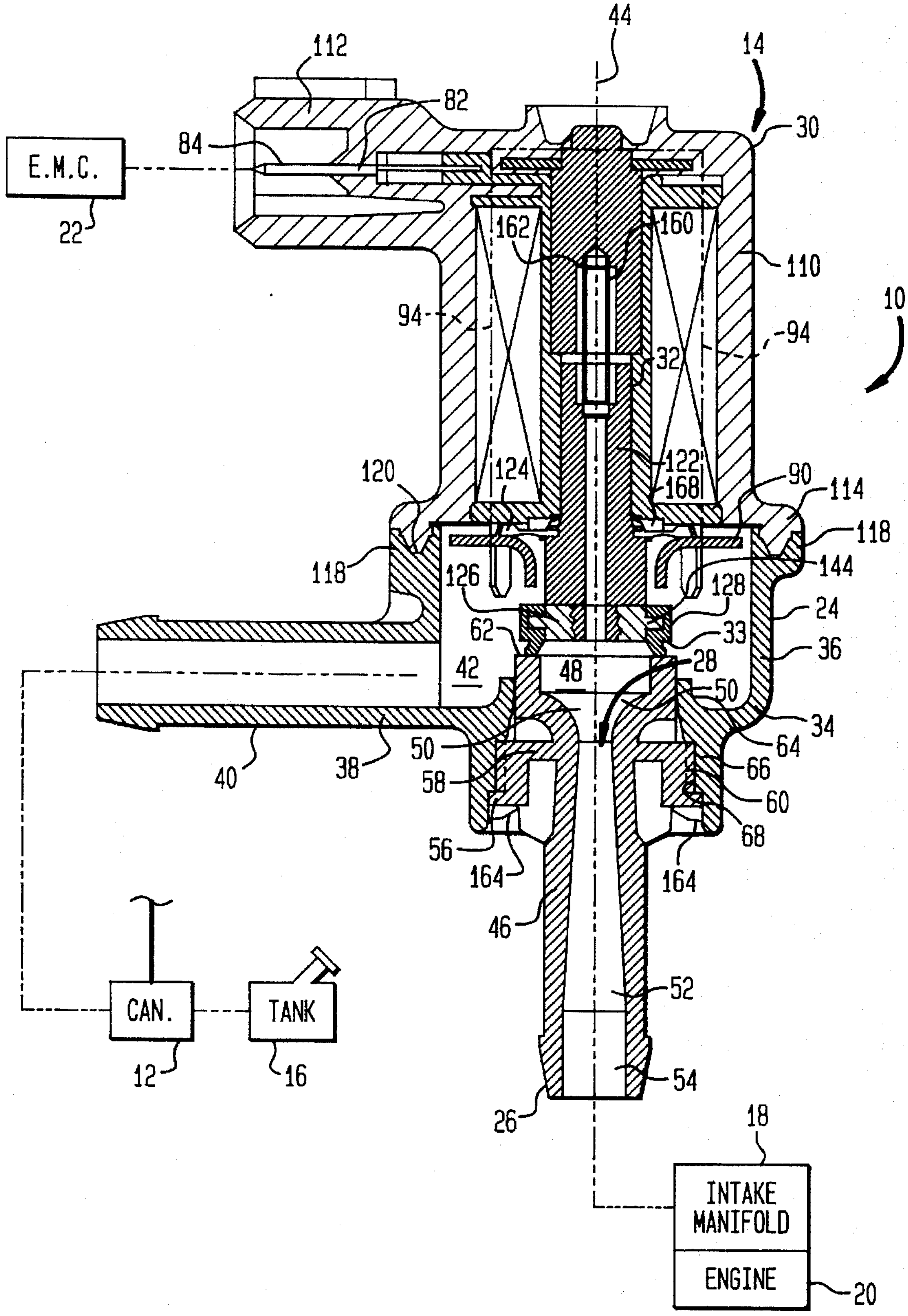
FIG. 1 is a longitudinal cross section view through a an exemplary emission control valve embodying principles of the invention, including a schematic association with an evaporative emission control system.

FIG. 1 shows an evaporative emission control system 10 of a motor vehicle comprising a vapor collection canister 12 and a CPS valve 14, embodying principles of the present invention, connected in series between a fuel tank 16 and an intake manifold 18 of an internal combustion engine 20 in the customary fashion. An engine management computer 22 supplies a purge control signal for operating valve 14.

CPS valve 14, shown in closed condition in FIG. 1, comprises a housing member 24, an outlet port 26 that includes a sonic nozzle structure 28, a solenoid coil sub-assembly 30, an armature sub-assembly 32, and a two-piece valve element 33. Housing member 24 comprises a cylindrical cup-shaped body 34 having an annular side wall 36 and an axial end wall 38. An inlet port, in the form of a tubular nipple 40, is integrally formed in the housing member to radially intercept side wall 36 and thereby provide communication of canister 12 to interior space 42 of housing member 24 that is bounded by walls 36, 38.

Reference numeral 44 designates an imaginary longitudinal axis of CPS valve 14 with which housing member 24, outlet port 26, solenoid coil sub-assembly 30, armature sub-assembly 32, and valve element 33 are coaxial. Outlet port 26 comprises a tubular wall 46 containing sonic nozzle structure 28 and providing a nipple for communicating the sonic nozzle structure to intake manifold 18. Wall 46 circumscribes a through-passage which comprises in succession from one of its axial ends to the other: a circular cylindrical segment 48; a radially convergent segment 50; a radially divergent segment 52; and a circular cylindrical segment 54.

Outlet port 26 further comprises an integral circular axial ring 56 disposed concentrically about wall 46, but spaced radially outward of that wall. Ring 56 and wall 46 integrally join via an annular radial wall 58 having its radially inner perimeter disposed proximate the narrowest portion of divergent segment 52 and its radially outer perimeter proximate one axial end of ring 56. The radially outer surface of ring 56 contains a screw thread 60 that provides for the attachment of outlet port 26 to housing member 24. The axial end of tubular wall 46 that contains segment 48 comprises a flat circular annular surface that provides a valve seat 62 disposed within interior space 42.

End wall 38 of housing member 24 comprises a central hole defined by a circular annular lip 64 that curls inwardly a short distance toward interior space 42. A circular annular socket 66 that is integrally formed with housing member 24 coaxial with axis 44 extends from the exterior of end wall 38. Socket 66 comprises an internal screw thread 68 via which outlet port 26 is assembled to housing member 24 by threading screw thread 68 to screw thread 60 and twisting the outlet port relative to the hole provided by the socket. The extent to which the two screw threads are threaded together establishes the axial positioning of outlet port 26 relative to housing member 24, and hence positioning of seat 62 within interior space 42.

Figure 2:
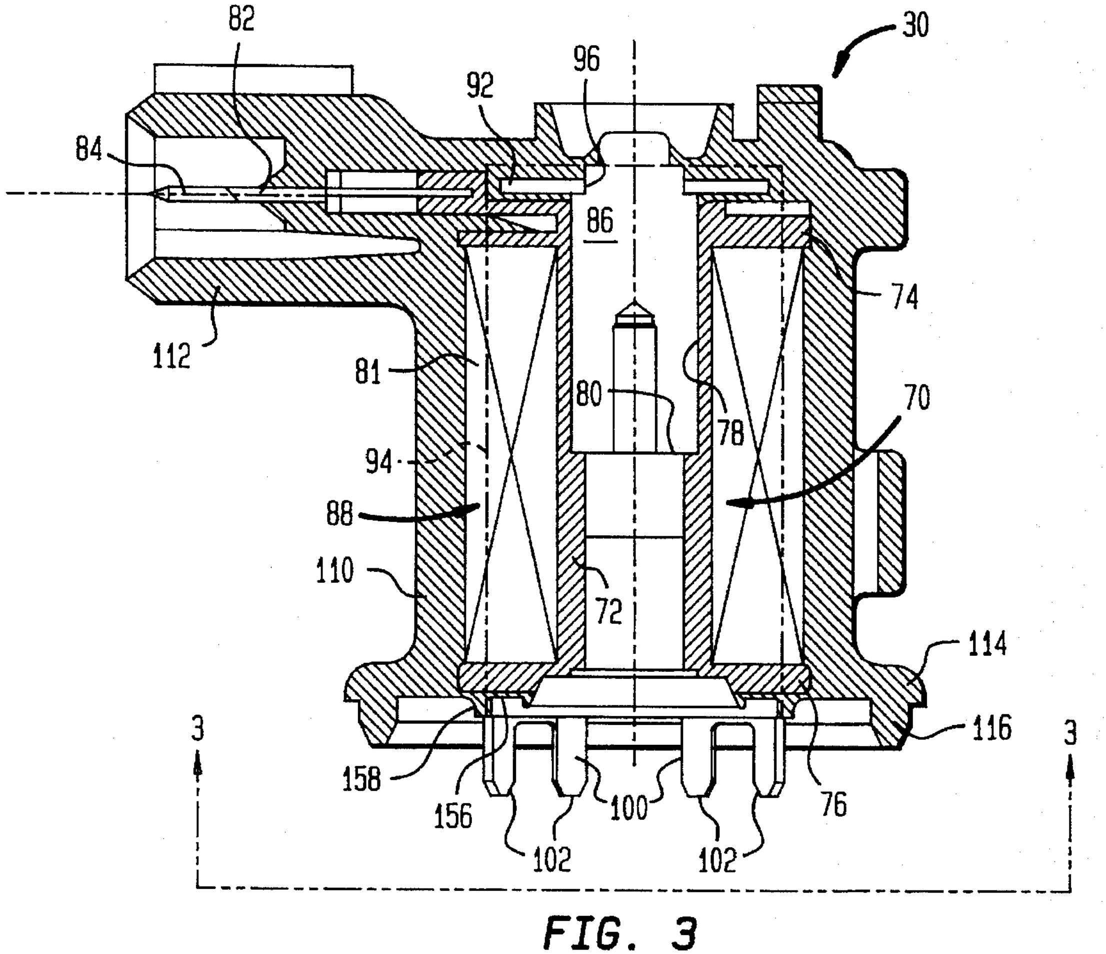
FIG. 2 a longitudinal cross section view through a sub-assembly of the valve shown by itself on an enlarged scale.
Figure 3:
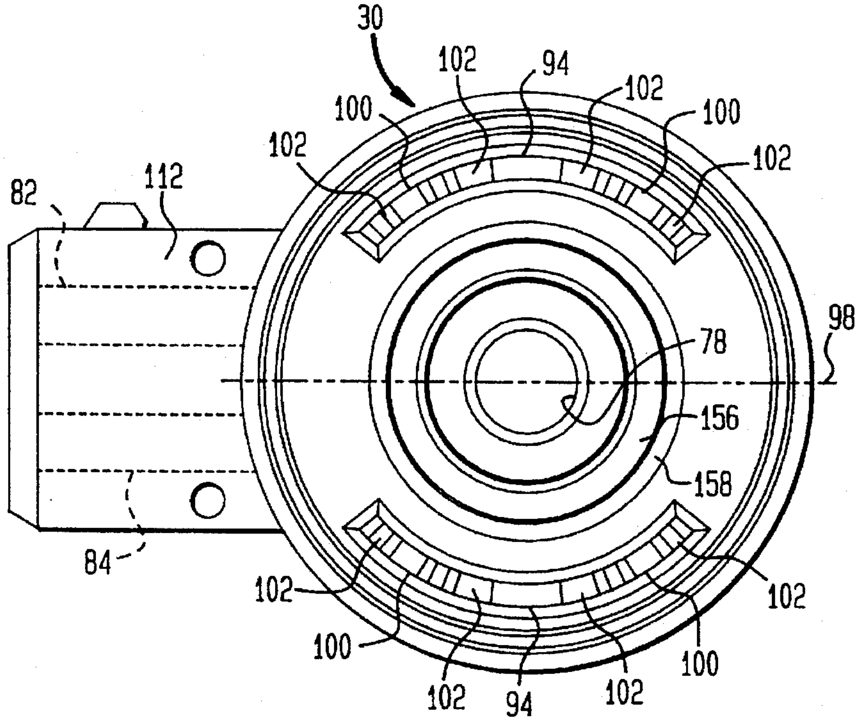
FIG. 3 is a full axial end view of FIG. 2 in the direction of arrows 3—3 in the latter FIG.

FIGS. 2 and 3 show further details of solenoid coil sub-assembly 30 which comprises a non-ferromagnetic bobbin 70 having a tubular core 72 with circular annular flanges 74, 76 at opposite axial ends. A through-hole 78 having an internal shoulder 80 extends through core 72 coaxial with axis 44. Magnet wire is wound around core 72 between flanges 74, 76 to form a bobbin-mounted electromagnetic coil 81. A portion of flange 74 is shaped to mount a pair of electric terminals 82, 84 whose free ends project transversely in parallel away from axis 44 beyond flange 74. Respective terminations of the magnet wire are joined to respective ones of these two terminals.

Stator structure is associated with the bobbin-mounted coil. This stator structure comprises a generally cylindrical ferromagnetic pole piece 86, the bulk of which is disposed within the portion of through-hole 78 between shoulder 80 and flange 74. A multiple-shouldered end of pole piece 86 protrudes beyond through-hole 78. The stator structure further comprises a ferromagnetic shell 88 and a shunt 90 (the shunt being shown in FIG. 4, but not in FIGS. 2 and 3).

Shell 88 is formed from sheet material to a shape which comprises a circular annular end wall 92 generally perpendicular to axis 44 and two diametrically opposite side walls 94 generally parallel to axis 44. End wall 92 has a circular through-hole 96 that allows it to be fitted coaxially onto a portion of the protruding end of pole piece 86. Each side wall 94 extends from the outer perimeter of end wall 92, being shaped to bend around the perimeter of flange 74, thence axially parallel for the full length of bobbin 70, and protruding beyond flange 76 as shown in FIG. 2. In the illustrated embodiment, the two side walls 94 are mirror images of each other about a diameter 98 through axis 44 as shown in FIG. 3. Each side wall is arcuately curved, being circularly concave toward the bobbin and coil. The two side walls pass flange 76 in close proximity, or even contact, thereto, and the portion of each that protrudes beyond that flange comprises two circumferentially spaced apart fingers 100, each of which is bifurcated into two identical circumferentially spaced apart tabs 102. FIGS. 2 and 3 show the condition of tabs 102 prior to shunt 90 being associated with the stator structure.

Figure 4:
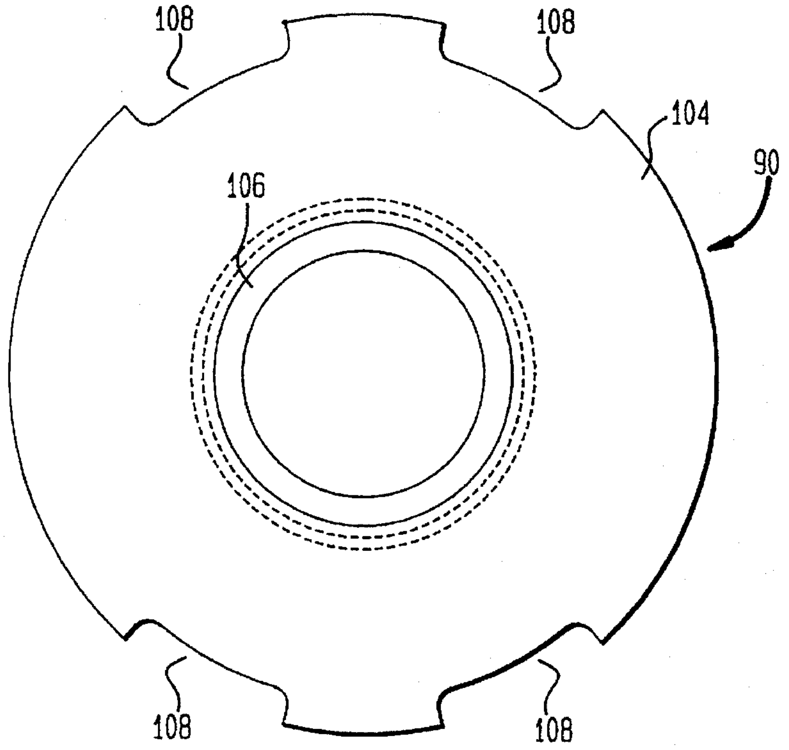
FIG. 4 is an axial end view of one component of the valve, namely a shunt, shown by itself on an enlarged scale.

Shunt 90 is shown by itself in FIG. 4 to comprise an annular-shaped ferromagnetic piece that has a generally flat, but notched, outer margin 104 and a curved inner margin 106. The perimeter of outer margin 104 is circular except for the presence of four notches 108 arranged in a pattern the same as that of fingers 100. As can be appreciated from consideration of FIGS. 1 and 4, fingers 100 fit in notches 108 when shunt 90 is disposed in the position shown in FIG. 1. As will be more fully explained later, the shunt is held secure in the FIG. 1 position by turning tabs 102 into interference conditions against margins of notches 108, although FIG. 1 shows the condition prior to tabs 102 being so turned.

After shell 88 has been associated with bobbin 70 in the manner mentioned, but before shunt 90 is placed, encapsulation is formed around the bobbin-mounted coil 81, including pole piece 86 and shell 88 as shown in FIG. 2. The encapsulation may be considered to form a second housing member 110 that cooperatively associates with housing member 24 to form a complete housing for the finished CPS valve 14. This second housing member 110 is shaped to form a surround 112 for the free ends of terminals 82, 84 thereby creating an electrical connector for connection with a mating connector (not shown) for connecting the valve to a purge control signal source (also not shown). The encapsulation material is also shaped to endow housing member 110 with a flange 114 containing a circular annular ridge 116 for axially fitting to complementary flange 118 and groove 120 structure (see FIG. 1) at the open axial end of housing member 24 when the two housing members 24, 110 are united, as will be more fully explained later.

FIG. 1 shows armature sub-assembly 32 and valve element 33 assembled together, with the former comprising a ferromagnetic armature member 122 and a flexible diaphragm 124, and the latter, a rigid valve member 126 and an elastomeric seal member 128.

Figure 5:
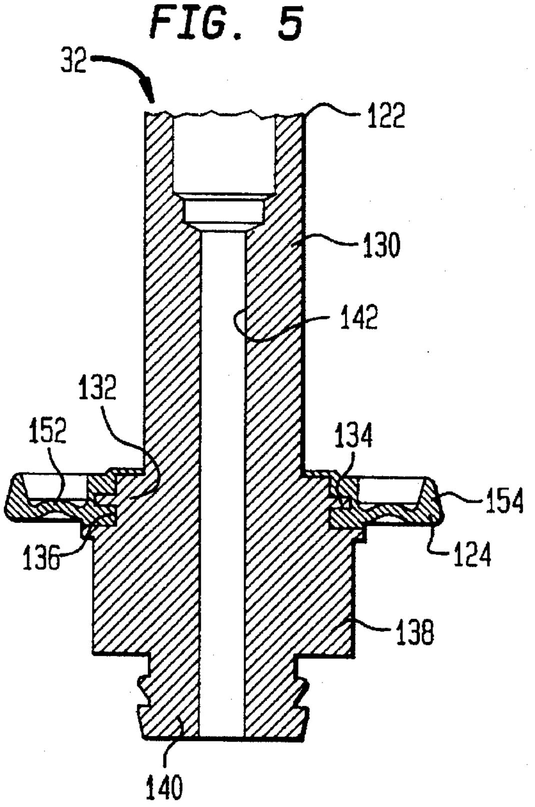
FIG. 5 is a longitudinal cross section view through another sub-assembly of the valve shown by itself on an enlarged scale.

FIG. 5 shows further detail of armature member 122 which is of generally circular cylindrical shape but comprises several sections of different outside diameters. A first section 130 provides a close sliding fit of armature member 122 within the portion of bobbin through-hole 78 that is between shoulder 80 and flange 76 so that sub-assembly 32 is coaxial with axis 44 in the completed CPS valve 14. A second section 132 immediately contiguous section 130 comprises, around its outside, a series of shoulders that form a circular radial ridge 134 and a circular radial groove 136 that provide for attachment of diaphragm 124. A third section 138 immediately contiguous section 132 comprises a diameter that is sized relative to the diameter of the circular hole defined by the curved inner margin 106 of shunt 90 to define an annular armature-stator air gap between margin 106 and section 138. A fourth section 140 immediately contiguous, and of smaller diameter than, section 138 provides for attachment of valve member 126 to armature member 122. Armature member 122 further comprises a through-hole 142 that is coaxial with axis 44 and that includes a two-shouldered counterbore facing the end of pole piece 86 disposed within bobbin through-hole 78.

Figure 6:
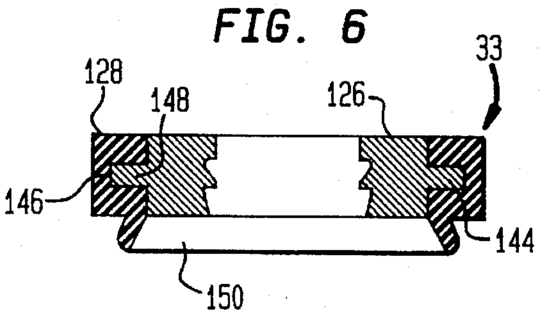
FIG. 6 is a longitudinal cross section view through another component of the valve, namely a valve element, shown by itself on an enlarged scale.

FIG. 1 shows valve member 126 of circular annular shape with its inside diameter fitted onto armature section 140 and secured to armature member 122 with one of its flat end faces abutting the flat end of armature section 138. The outside diameter of valve member 126 is nominally equal to that of armature section 138, but includes a radially protruding circular ridge 144 (see also FIG. 6) midway between its flat end faces. FIG. 6 further shows seal member 128 to comprise a ring-shaped circular body 146 which has an axial dimension equal to that of section 140 of armature member 122 and a groove 148 on its inside diameter providing for body 146 to fit onto the outside diameter of valve member 126. A frustoconical sealing lip 150 flares radially outward from the end of body 146 that is toward valve seat 62 to seal against valve seat 62, when the CPS valve is in the closed condition shown in FIG. 1.

Figure 7:
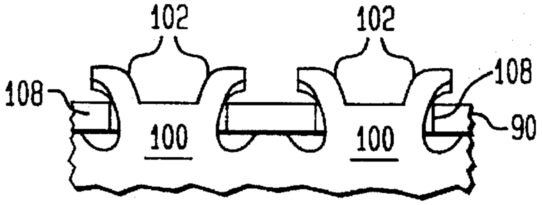
FIG. 7 is a fragmentary view in the general direction of arrows 7—7 in FIG. 3 showing a condition after the sub-assemblies of FIGS. 2 and 5 and the component of FIG. 4 have been assembled together.

FIG. 5 further shows diaphragm 124 to comprise an inner margin having a grooved inside diameter for fitting in a sealed manner to ridge 134 and groove 136 of armature member 122. A flexible radial wall 152 extends from the diaphragm's inner margin to a circular axial lip 154 forming the diaphragm's outer margin. In the completed CPS valve 14, lip 154 is captured in a sealed manner between a portion of shunt 90 and a confronting groove 156 (see FIGS. 2 and 3) formed in a portion of housing member 110 that covers a portion of the axial end face of bobbin flange 76. Lip 154 is captured by inserting armature member 122 into bobbin through-hole 78, then placing shunt 90 onto solenoid sub-assembly 30 with fingers 100 fitted to notches 108, and then bending tabs 102 into interference with margins of notches 108 as shown in FIG. 7, to securely retain the shunt in place, thereby uniting solenoid sub-assembly 30, armature sub-assembly 32, and shunt 90. The extent to which lip 154 is compressed is controlled by positive abutment of shunt 90 with a ridge 158 that forms the outside of groove 156. Thereafter, valve element 33 is assembled to sub-assembly 32.

Prior to armature member 122 being inserted into through-hole 78, a helical coil bias spring 160 is placed between pole piece 86 and the armature member such that upon uniting solenoid sub-assembly 30, armature sub-assembly 32, and shunt 90, one end of the spring will seat in a blind counterbore 162 in pole piece 86 and the opposite end will seat against a shoulder of the counterbore at the end of armature member 122 confronting pole piece 86.

The two housing members are then placed together with the two flanges 114, 118 in abutment and joined by any suitable means of joining to assure that the joint is vapor-tight. At this time outlet port 46 may be screwed into socket 66 to achieve a desired positioning of seat 62 within interior space 42. Upon attainment of a desired seat position, ring 56 is locked against rotation, and the threaded connection is sealed vapor-tight so that vapor cannot pass between the ring and socket. A convenient means for accomplishing both this locking and sealing is to apply a suitable adhesive sealant through the open end of the socket to create a plug, such as that shown at 164 in FIG. 1.

The delivery of a purge control signal to valve 14 creates electric current flow in coil 81, and this current flow creates magnetic flux that is concentrated in a magnetic circuit that comprises armature member 122, the aforementioned stator structure, the air gap between shunt 90 and armature member 122, and the air gap between armature member 122 and pole piece 86. As the current increases, increasing force is applied to armature member 122 in the direction of increasingly displacing valve element 33 away from valve seat 62. This force is countered by the increasing compression of spring 160. The extent to which valve element 33 is displaced away from seat 62 is well-correlated with the current flow, and because of force-balancing and the sonic flow, the valve operation is essentially insensitive to varying manifold vacuum. The maximum displacement of armature 122 and valve element 33 away from valve seat 62 is defined by abutment of the inner margin of diaphragm 124 with the confronting end of bobbin core 72.

In the operative emission control system 10, intake manifold vacuum is delivered through outlet 26 and will act on the area circumscribed by the seating of lip 150 on seat 62. Absent force-balancing, varying manifold vacuum will vary the force required to open valve 10 and hence render variable the amount of energizing current to coil 81 that is required to operate valve element 33. Force-balancing de-sensitizes valve operation, initial valve opening in particular, to varying manifold vacuum. In the inventive CPS valve 14, force-balancing is accomplished by a communication path, provided via through-hole 142 to the portion of through-hole 78 interior of pole piece 86 and thence to an annular space 168 that is closed to interior space 42 by diaphragm 124. By making the closed force-balancing space exposed to manifold vacuum communicated via through-hole 142 have an effective armature/diaphragm area equal to the area circumscribed by the seating of lip 150 on seat 62, the force acting to resist unseating of the closed valve element is nullified by an equal force acting in the opposite axial direction. Hence, the CPS valve is endowed with a well-defined and predictable opening characteristic which is important in achieving a desired control strategy for canister purging.

Once the valve has opened beyond an initial unseating transition, sonic nozzle structure 28 becomes effective as a true sonic nozzle (assuming sufficient pressure differential between inlet and outlet ports) providing sonic purge flow and being essentially insensitive to varying manifold vacuum. Assuming that the properties of the vapor being purged, such as specific heat, gas constant, and temperature, are constant, mass flow through the valve is a function of essentially only the pressure upstream of the sonic nozzle. The restriction between the valve element and the valve seat upon initial valve element unseating and final valve element reseating does create a pressure drop preventing full sonic nozzle operation, but because these transitions are well-defined, and of relatively short duration, actual valve operation is well-correlated with the actual purge control signal applied to it. The inventive valve is well-suited for operation by a pulse width modulated (PWM) purge control signal waveform from engine management computer 22 composed of rectangular voltage pulses having substantially constant voltage amplitude and occurring at selected frequency.

Figure 8:
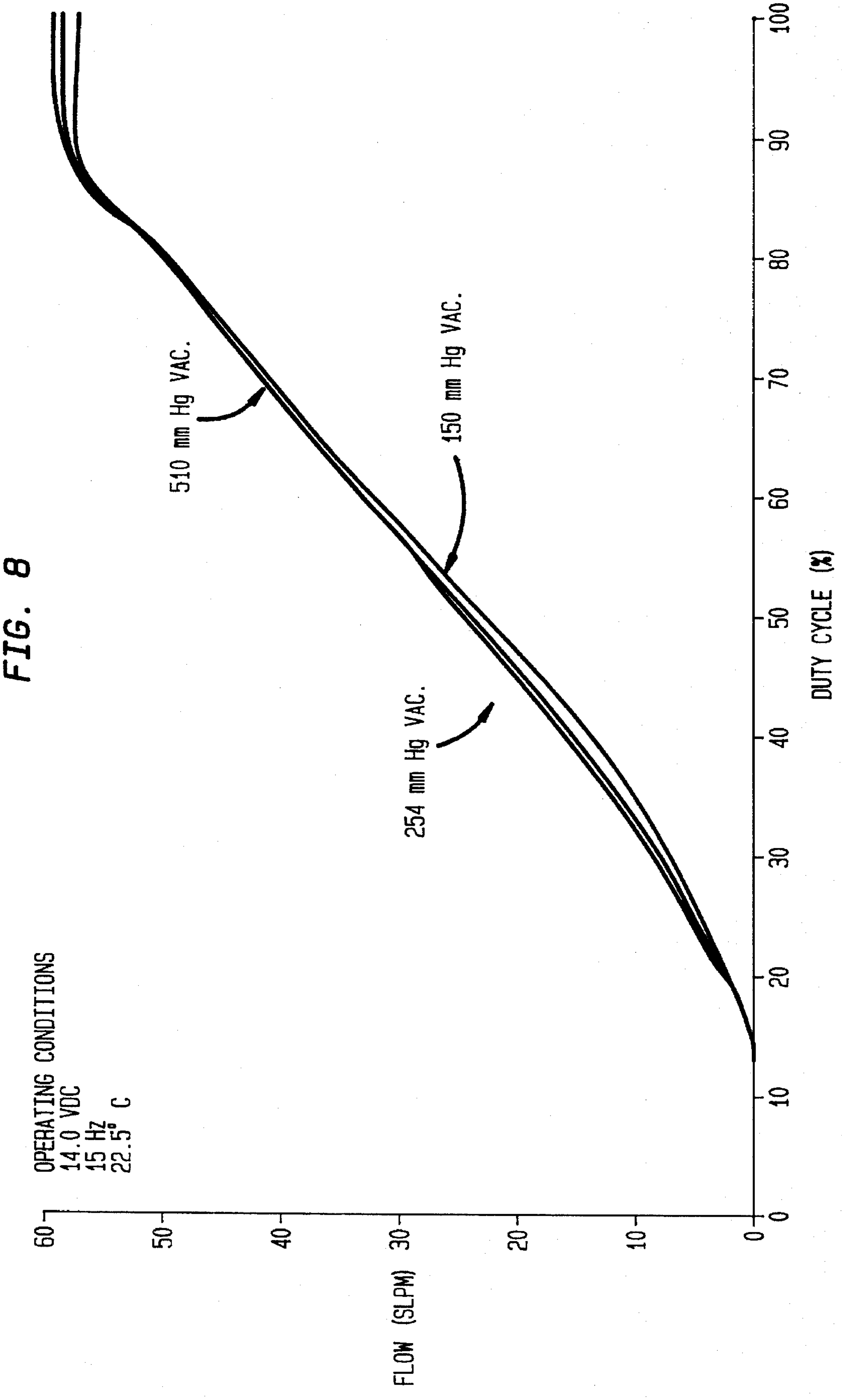
FIG. 8 is a representative graph plot useful in appreciating the improvement provided by the inventive valve.

FIG. 8 shows a representative flow vs. duty cycle characteristics for a purge valve at different manifold vacuum levels. It can be seen that the curves are substantially identical despite changing manifold vacuum.

While a presently preferred embodiment of the invention has been illustrated and described, it should be appreciated that principles are applicable to other embodiments that fall within the scope of the following claims.

What is claimed is:

1. In a vapor collection system for an internal combustion engine fuel system wherein a canister purge valve disposed in a purge flow path between an intake manifold of an engine and a fuel vapor collection canister that collects vapor generated by volatile fuel in a fuel tank controls the purging of the canister to the intake manifold in accordance with a purge control signal that defines the extent to which the canister purge valve allows purge flow through the purge flow path, the improvement in the purge valve which comprises, the purge valve comprising a body having an interior space through which purge flow passes, a tube forming a section of the purge flow path and comprising an annular valve seat, the tube disposing the valve seat within the interior space in circumscribing relation to the section of the purge flow path, a valve element controlled by the purge control signal in relation to the valve seat for establishing the extent to which the canister purge valve allows flow from the canister to the intake manifold, and means relating the tube to the valve body comprising a screw thread on the tube, a hole in the valve body comprising a complementary screw thread with which the screw thread of the tube is threadedly engaged to provide for the valve seat to be disposed at a desired axial location within the interior space during fabrication of the valve by twisting the tube relative to the hole in the body, and means effective once the valve seat has been positioned in a desired axial location for constraining the tube against further twisting on the body and sealing the tube to the hole to cause the purge flow to pass through the tube and not leak between the tube and the hole.

2. The improvement as set forth in claim 1 in which the means effective once the valve seal has been positioned in a desired axial location for constraining the tube against further twisting on the body and sealing the tube to the hole to cause the purge flow to pass through the tube and not leak between the tube and the hole comprises an adhering sealant that is applied between the tube and the hole to form a plug that constrains the tube against further twisting on the body and seals the tube to the hole.

3. The improvement as set forth in claim 1 in which the tube comprises a tubular wall forming the section of the purge flow path, a ring circumscribing and spaced radially outward of the tubular wall, and a radial wall joining the ring to the tubular wall, wherein the screw thread of the tube is disposed on the ring.

4. The improvement as set forth in claim 3 in which the seat is at an axial end of the tubular wall, the section of the purge flow path in the tubular wall comprises a sonic nozzle, and the ring is disposed axially in circumscribing relation to the sonic nozzle.

5. The improvement as set forth in claim 1 including force-balancing means comprising a communication path from the section of the purge flow path in the tube to an enclosed force-balancing space that, when the valve element is seated on the valve seat, communicates the section of the purge flow path in the tube to the force-balancing space to force-balance the valve element so that the valve element is substantially de-sensitized to changes in vacuum in the section of the purge flow path in the tube.

6. The improvement as set forth in claim 5 including a solenoid comprising an armature for operating the valve element and a bobbin that contains an electromagnetic coil and that has a hole for guiding the armature, and wherein the force-balancing space is closed to the interior space by a diaphragm having an inner margin sealed to the armature and an outer margin sealed to a portion of the solenoid that circumferentially bounds the bobbin hole.

7. The improvement as set forth in claim 6 in which the solenoid comprises stator structure providing, in cooperation with the armature, a magnetic circuit path, wherein the stator structure comprises an annular shunt disposed within the interior space and capturing the outer margin of the diaphragm against the portion of the solenoid that circumferentially bounds the bobbin hole.

8. The improvement as set forth in claim 7 in which the stator structure comprises side wall structure that extends axially of the solenoid and comprises means for retaining the shunt on the solenoid.

9. The improvement as set forth in claim 8 in which the means for retaining the shunt on the solenoid comprises tabs on the stator side wall structure that have interference with margins of notches in the shunt.

10. In a vapor collection system for an internal combustion engine fuel system wherein a canister purge valve disposed in a purge flow path between an intake manifold of an engine and a fuel vapor collection canister that collects vapor generated by volatile fuel in a fuel tank controls the purging of the canister to the intake manifold in accordance with a purge control signal that defines the extent to which the canister purge valve allows purge flow through the purge flow path, the improvement in the purge valve which comprises, the purge valve comprising a body having an inlet port, an outlet port, and an interior space between the inlet and the outlet ports through which purge flow passes, a valve element controlled by the purge control signal in relation to a valve seat for establishing the extent to which the canister purge valve allows flow from the canister to the intake manifold, a solenoid comprising an armature for operating the valve element and a bobbin that contains an electromagnetic coil and that has a hole for guiding the armature, including force-balancing means comprising a communication path from the outlet port to an enclosed force-balancing space that, when the valve element is seated on the valve seat, communicates the outlet port to the force-balancing space to force-balance the valve element so that the valve element is substantially de-sensitized to changes in intake manifold vacuum communicated to the outlet port, wherein the communication path comprises a passage through the armature.

11. The improvement as set forth in claim 10 wherein the force-balancing space is closed to the interior space by a diaphragm having an inner margin sealed to the armature and an outer margin sealed to a portion of the solenoid that circumferentially bounds the bobbin hole.

12. The improvement as set forth in claim 11 in which the solenoid comprises stator structure providing, in cooperation with the armature, a magnetic circuit path, wherein the stator structure comprises an annular shunt disposed within the interior space and capturing the outer margin of the diaphragm against the portion of the solenoid that circumferentially bounds the bobbin hole.

13. The improvement as set forth in claim 12 in which the stator structure comprises side wall structure that extends axially of the solenoid and comprises means for retaining the shunt on the solenoid.

14. The improvement as set forth in claim 13 in which the means for retaining the shunt on the solenoid comprises tabs on the stator side wall structure that have interference with margins of notches in the shunt.

15. The improvement as set forth in claim 14 wherein the outlet port comprises a tube containing a sonic nozzle.

16. An automotive vehicle emission control valve comprising a body having an inlet port, an outlet port, and an interior space between the inlet and the outlet ports through which gaseous emissions pass, a valve element controlled by a control signal in relation to a valve seat for establishing the extent to which the valve allows flow of gaseous emissions, a solenoid comprising an armature for operating the valve element and a bobbin that contains an electromagnetic coil and that has a hole for guiding the armature, stator structure providing, in cooperation with the armature, a magnetic circuit path, wherein the stator structure comprises side wall structure that extends axially of the solenoid and an annular shunt at an end of the solenoid providing an air gap in the magnetic circuit between the stator structure and the armature, and means for retaining the shunt on the solenoid comprising tabs one of the stator side wall structure and the shunt and notches in the other of the stator side wall structure and the shunt, wherein the tabs pass through the notches and are in interference with margins of the notches.

17. An automotive vehicle emission control valve as set forth in claim 16 in which the notches are in the shunt and the tabs are on the stator side wall structure.

18. An automotive vehicle emission control valve as set forth in claim 17 in which the stator side wall structure comprises two diametrically opposite side walls, each containing plural tabs.

19. An automotive vehicle emission control valve as set forth in claim 16 in which the shunt comprises a curved inner margin at the air gap.

20. A method of making an automotive vehicle emission control valve comprising a body having an interior space through which gaseous emissions pass, a valve element controlled by a control signal in relation to a valve seat for establishing the extent to which the valve allows flow of gaseous emissions, a solenoid comprising an armature for operating the valve element and a bobbin that contains an electromagnetic coil and that has a hole for guiding the armature, stator structure providing, in cooperation with the armature, a magnetic circuit path, wherein the stator structure comprises side wall structure that extends axially of the solenoid and a shunt at an end of the solenoid providing an air gap in the magnetic circuit between the stator structure and the armature, and means for retaining the shunt on the solenoid in magnetic conductivity with the side wall, the method comprising assembling the armature to the solenoid by inserting an axial end portion of the armature into the bobbin hole, then assembling the shunt to the solenoid, and then assembling the valve element to the armature.

* * * * *